US012786750B2

(12) United States Patent
Ren et al.

(10) Patent No.: US 12,786,750 B2
(45) Date of Patent: Nov. 3, 2026

(54) REDUCED CAPABILITY MACHINE LEARNING WITH ASSISTANCE

(71) Applicant: QUALCOMM Incorporated, San Diego, CA (US)

(72) Inventors: Yuwei Ren, Beijing (CN); Huilin Xu, Temecula, CA (US); Fei Huang, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 18/685,740

(22) PCT Filed: Oct. 18, 2021

(86) PCT No.: PCT/CN2021/124299

§ 371 (c)(1),
(2) Date: Feb. 22, 2024

(87) PCT Pub. No.: WO2023/065060

PCT Pub. Date: Apr. 27, 2023

(65) Prior Publication Data

US 2024/0365136 A1 Oct. 31, 2024

(51) Int. Cl.

| | |
|---|---|
| ***H04W 24/02*** | (2009.01) |
| ***H04W 8/22*** | (2009.01) |
| ***H04W 24/08*** | (2009.01) |

(52) U.S. Cl.

CPC ............ *H04W 24/02* (2013.01); *H04W 8/22* (2013.01); *H04W 24/08* (2013.01)

(58) Field of Classification Search

CPC ........ H04W 24/02; H04W 24/08; H04W 8/22
See application file for complete search history.

(56) References Cited

U.S. PATENT DOCUMENTS

2020/0272899 A1* 8/2020 Dunne .................. G06N 3/098
2022/0051139 A1* 2/2022 Tullberg ................. H04L 69/04
(Continued)

FOREIGN PATENT DOCUMENTS

CN 112152948 A 12/2020
CN 113228064 A 8/2021
(Continued)

OTHER PUBLICATIONS

International Search Report and Written Opinion—PCT/CN2021/124299—ISA/EPO—Jul. 19, 2022.
(Continued)

*Primary Examiner* — Kenny S Lin
(74) *Attorney, Agent, or Firm* — Dinsmore & Shohl LLP

(57) ABSTRACT

Various aspects of the present disclosure generally relate to wireless communication. In some aspects, a first user equipment (UE) may receive assistance information indicating a second UE to provide assistance relating to training or utilizing a model. The first UE may receive, from the second UE and based at least in part on the assistance information, information based at least in part on a measurement by the second UE. The first UE may train a model using the information based at least in part on the measurement. The first UE may perform a communication based at least in part on the model. Numerous other aspects are described.

24 Claims, 14 Drawing Sheets

(56) References Cited

U.S. PATENT DOCUMENTS

| | | | | |
|---|---|---|---|---|
| 2022/0335337 | A1* | 10/2022 | Kovács | H04W 8/24 |
| 2023/0019669 | A1* | 1/2023 | Alabbasi | G06N 3/09 |
| 2023/0037704 | A1* | 2/2023 | Hirzallah | H04W 64/006 |

FOREIGN PATENT DOCUMENTS

| | | | | | |
|---|---|---|---|---|---|
| EP | 3699825 | A2 | | 8/2020 | |
| JP | 2021026505 | A | | 2/2021 | |
| WO | WO-2021019498 | A1 | | 2/2021 | |
| WO | 2021063500 | A1 | | 4/2021 | |
| WO | WO-2021107831 | A1 | | 6/2021 | |
| WO | WO-2023026414 | A1 | * | 3/2023 | H04W 24/10 |

OTHER PUBLICATIONS

Supplementary European Search Report—EP219608221—Search Authority—The Hague—Jun. 11, 2025.

* cited by examiner

REDUCED CAPABILITY MACHINE LEARNING WITH ASSISTANCE

CROSS-REFERENCE TO RELATED APPLICATION

This application is a 371 national stage of Patent Cooperation Treaty (PCT) Application No. PCT/CN2021/124299 filed on Oct. 18, 2021, entitled "REDUCED CAPABILITY MACHINE LEARNING WITH ASSISTANCE," which is hereby expressly incorporated by reference herein.

INTRODUCTION

Aspects of the present disclosure relate to wireless communications, and more particularly, to techniques for training or utilizing a model with assistance from a user equipment (UE).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Some aspects described herein relate to a method of wireless communication performed by a first user equipment (UE). The method may include receiving assistance information indicating a second UE to provide assistance relating to training or utilizing a model. The method may include receiving, from the second UE and based at least in part on the assistance information, information based at least in part on a measurement by the second UE. The method may include training a model using the information based at least in part on the measurement. The method may include performing a communication based at least in part on the model.

Some aspects described herein relate to a method of wireless communication performed by a first UE. The method may include transmitting assistance information indicating that the first UE is configured to provide assistance relating to training or utilizing a model. The method may include receiving information indicating the model. The method may include training the model based at least in part on a measurement value. The method may include providing one or more parameters of the model, or a result determined using the model, to a second UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
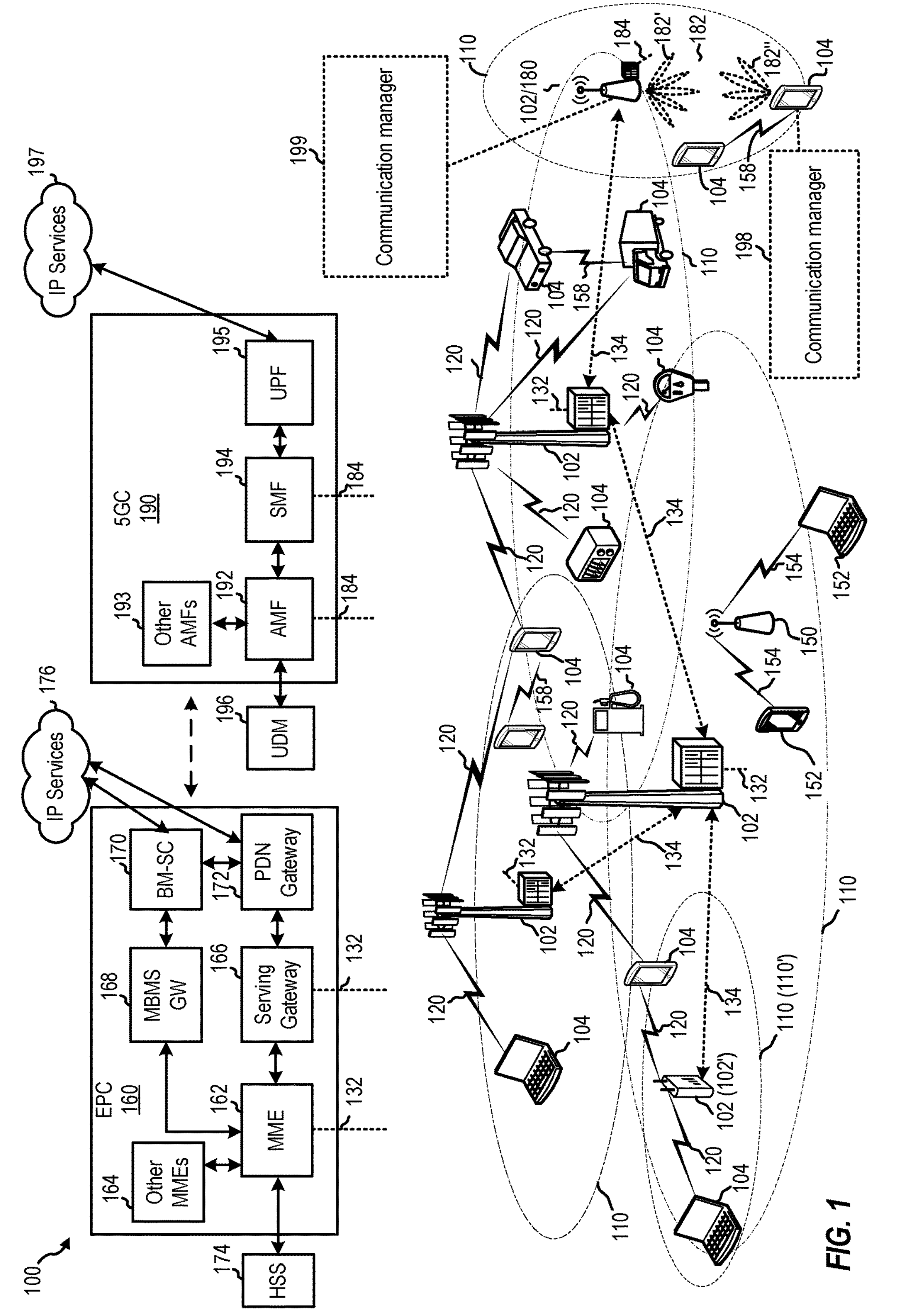
FIG. 1 is a block diagram illustrating an example wireless communication network.

Aspects of the present disclosure provide apparatuses, methods, processing systems, and computer-readable media for training or utilizing a model with assistance from a user equipment (UE).

In some aspects, a base station may serve different UEs of different categories and/or different UEs that support different capabilities. For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category and may be referred to as a reduced capability (RedCap) UE, a low tier UE, and/or an NR-Lite UE, among other examples. A UE of the second category may have an advanced feature set compared to UEs of the second category, and may be referred to as a baseline UE, a high tier UE, an NR UE, and/or a premium UE, among other examples.

As wireless networks evolve, the techniques used to determine various forms of information, such as channel state feedback, positioning information, channel estimation, and so on, may become more complex. Models trained using machine learning techniques may address this increasing complexity. For example, machine learning based modeling (such as based on neural networks or the like) may provide a significant performance improvement at the cost of increased computational complexity. Thus, machine learning based modeling may involve increased power consumption and processor usage relative to more straightforward techniques for determining such information.

There are situations where a RedCap UE may benefit from machine learning based modeling, such as for determination of channel state feedback, positioning information, or the like. However, as mentioned above, RedCap UEs are associated with reduced capabilities relative to baseline UEs. Therefore, training and operating a machine learning based model at a RedCap UE may be processor-intensive and may consume significant power. Moreover, some RedCap UEs may lack features necessary for training and/or utilizing a machine learning model, such as an antenna configuration, a sensor, a global positioning system (GPS) module, or the like. Thus, such a RedCap UE may be incapable of training or utilizing a machine learning based model using measurements associated with the features.

Some techniques and apparatuses described herein provide assistance between UEs for machine learning based modeling. For example, a first UE (e.g., a RedCap UE) may receive assistance from a second UE (e.g., a non-RedCap UE). The assistance may include, for example, performing a measurement associated with a model, training a model using machine learning, utilizing a model based at least in part on a measurement value, providing parameters of a trained model, or the like. Some techniques and apparatuses described herein provide signaling involved in such assistance.

In this way, RedCap UEs can take advantage of machine learning based modeling, which may improve accuracy and performance of the RedCap UE. Furthermore, by receiving assistance from the non-RedCap UE, power consumption and processor usage at the RedCap UE may be reduced, and the RedCap UE may be capable of utilizing (or using information determined based at least in part on) models that rely on features that the RedCap UE lacks.

Some techniques described herein include a RedCap UE receiving assistance from a non-RedCap UE. However, the techniques described herein can be implemented with any pair of UEs, such as two non-RedCap UEs, two RedCap UEs, a RedCap UE providing assistance for a non-RedCap UE, or the like.

Introduction to Wireless Communication Networks

FIG. 1 depicts an example of a wireless communications network 100, in which aspects described herein may be implemented.

Generally, wireless communications network 100 includes base stations (BSs) 102, UEs 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes communication manager 199, which may be configured to perform configuration to facilitate assistance for machine learning training or utilization.

Wireless communication network 100 includes communication manager 198, which may be configured to transmit or receive assistance information; receive or determine information based at least in part on a measurement; train a model; perform a communication; provide one or more parameters of the model; and/or provide a result.

Figure 2:
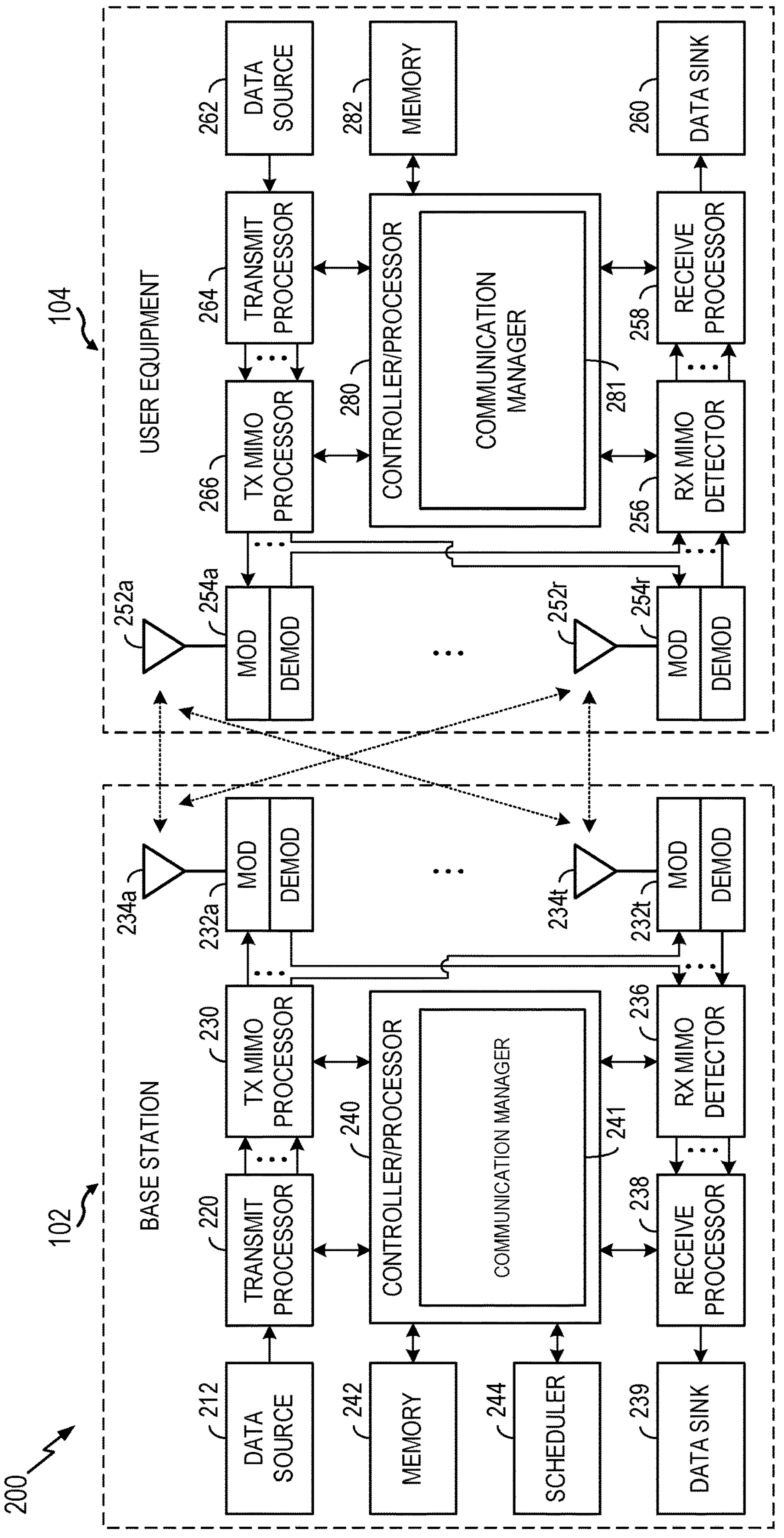
FIG. 2 is a block diagram illustrating aspects of an example of a base station and user equipment (UE).

FIG. 2 depicts aspects of an example BS 102 and a UE 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes communication manager 241, which may be representative of communication manager 199 of FIG. 1. Notably, while depicted as an aspect of controller/processor 240, communication manager 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes communication manager 281, which may be representative of communication manager 198 of FIG. 1. Notably, while depicted as an aspect of controller/processor 280, communication manager 281 may be implemented additionally or alternatively in various other aspects of user equipment 104 in other implementations.

Figures 3A, 3B, 3C, 3D:
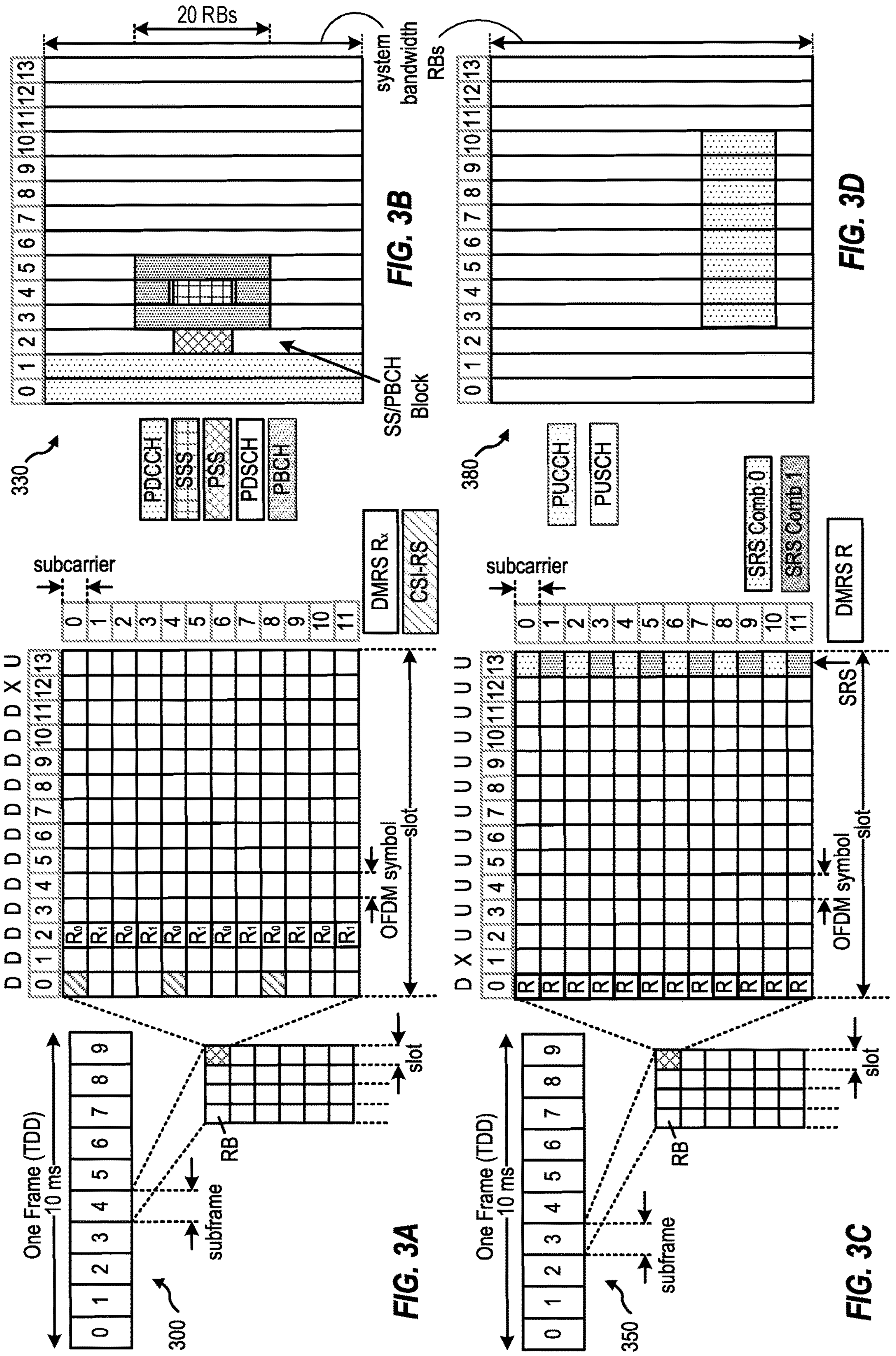
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Figure 4:
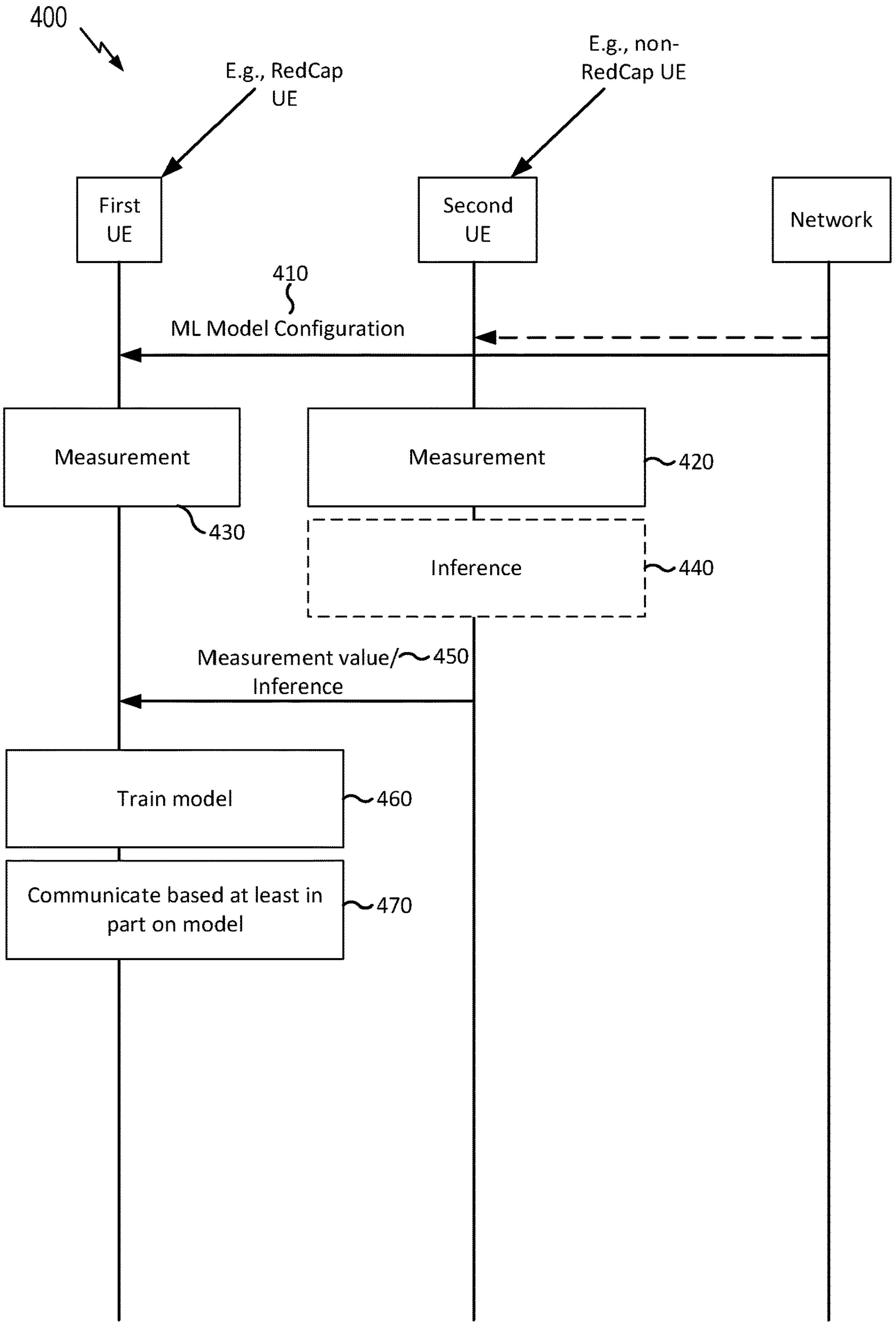
FIG. 4 is a diagram illustrating an example of assistance associated with measurement for training a machine learning model.

Aspects Related to Assistance for Machine Learning Model Training and Utilization FIG. 4 is a diagram illustrating an example 400 of assistance associated with measurement for training a machine learning model. As shown, example 400 includes a first UE (such as the UE 104), a second UE (such as the UE 104), and a network (such as a base station 102). Example 400 is an example where the second UE provides assistance by performing a measurement and providing a measurement value or an inference based at least in part on the measurement to the first UE. The first UE may use the inference or the measurement value to train a model at the first UE, as described below. Example 400 may be useful in a case where the first UE cannot directly use the second UE's trained model parameters due to a configuration of the first UE being incompatible with the model. For example, a number or configuration of antennas of the first UE, a positioning capability of the first UE, or a coverage range of the first UE may be incompatible with the model. A configuration of the first UE may be considered incompatible with the model if the configuration of the first UE does not or cannot provide information used as an input for the model. For example, if the model uses a measurement value based at least in part on a particular reference signal that the first UE is incapable of detecting, then the configuration of the first UE is incompatible with the model.

As shown, in some examples, the first UE may be a RedCap UE and the second UE may be a non-RedCap UE. For example, a base station may serve different UEs of different categories and/or different UEs that support different capabilities. For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a RedCap UE, a low tier UE, and/or an NR-Lite UE, among other examples. A UE of the first category may be, for example, a machine-type communication (MTC) UE, an enhanced MTC (eMTC) UE, and/or an Internet of Things (IoT) UE. A UE of the second category may have an advanced feature set compared to UEs of the second category, and may be referred to as a baseline UE, a high tier UE, an NR UE, and/or a premium UE, among other examples. UEs of the first category may be used for, for example, metering devices, asset tracking, and personal IoT devices.

For example, UEs of the first category may support a lower maximum modulation and coding scheme (MCS) than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples.

As shown by reference number 410, the network may provide, to the first UE or the second UE, a configuration for a model. For example, the model may be trained using machine learning. In some examples, the model may be based at least in part on a neural network, though the techniques described herein are not limited to those involving neural networks. In some aspects, the model may be associated with an application. For example, different models may be configured for different applications (e.g., a first model may be configured for channel state feedback determination, and a second model may be configured for positioning). As another example, different models may be configured for the same application. For example, these models may be optimized for different scenarios and/or may have different levels of complexity. As another example, there may be one baseline model to support both indoor and outdoor positioning, and each of indoor positioning and outdoor positioning may also be configured with a separate model specific to indoor positioning or outdoor positioning.

As shown by reference numbers 420 and 430, the first UE and the second UE may each perform a measurement. For example, the first UE may perform a measurement, and the second UE may perform the same measurement, the same type of measurement, or a different type of measurement. In some aspects, the first UE may be associated with a different configuration than the second UE. For example, the second UE's configuration may be compatible with the model, and the first UE's configuration may be incompatible with the model. As another example, the second UE's configuration may be more suitable for training the model than the first UE's configuration. For example, if the model is to determine positioning information, the first UE does not include a GPS component, and the second UE includes a GPS component, then the first UE may determine positioning information without using a GPS component and the second UE may determine positioning information using the GPS component (where the positioning information determined using the GPS component may be more accurate and/or precise than the positioning information determined without using a GPS component). The configuration may indicate, for example, a number of antennas of a UE, a positioning capability of a UE, a coverage range of a UE, or the like.

As shown by reference number 440, in some aspects, the second UE may determine an inference based at least in part on the second UE's measurement. In some aspects, the second UE may determine the inference based at least in part on a model, such as a model trained using machine learning. In some other aspects, the second UE may determine the inference without using a model. As used herein, "inference" may refer to information determined based at least in part on a measurement value. For example, an inference may be an output of a model that uses a measurement value as an inference. In some aspects, an inference may include channel state feedback. In some aspects, an inference may include positioning information. In some aspects, an inference may include information indicating channel conditions. In some aspects, the inference determined by the second UE at reference number 440 (or the measurement value determined by the second UE at reference number 430) may correspond to an output of the model configured by the network, as described in more detail below.

As shown by reference number 450, the second UE may provide the inference or the measurement value to the first UE. For example, the second UE may provide information based at least in part on the measurement performed at reference number 420 to the first UE. In some aspects, the second UE may provide the information via a local link with the first UE, such as a sidelink connection, a WiFi connection, a Bluetooth connection, or the like. in some other aspects, the second UE may provide the information via the network.

As shown by reference number 460, the first UE may train the model based at least in part on the inference or the measurement value. For example, the first UE may use the measurement value determined at reference number 420 or the inference determined at reference number 440 to train the model. In some aspects, the first UE may use the measurement value or the inference as a ground truth for training the model. A ground truth is an expected (e.g., ideal) result to be outputted by the model. A machine learning algorithm may use the measurement value determined by the first UE at reference number 430 and the ground truth to determine parameters of the model. For example, the machine learning algorithm may train the model such that, if the model receives the measurement value determined by the first UE at reference number 430 as input, the model outputs the inference determined at reference number 440 or the measurement value determined at reference number 420. Thus, the model may be trained to receive, as input, measurement values determined in accordance with the configuration of the first UE. The model may output an inference based at least in part on the ground truth, which is determined using the configuration of the second UE. In this way, the second UE may facilitate training of the model using measurement values or inferences determined by the second UE. This may facilitate the usage of measurement values or inferences determined using capabilities not present at the first UE to train the model, which enable the first UE to estimate such measurement values or inferences without the use of such capabilities. Furthermore, processing and communication resources of the first UE that would otherwise be used to determine the inference shown by reference number 440 are conserved.

As shown by reference number 470, the first UE may communicate based at least in part on the model. For example, the first UE may determine an inference using the model based at least in part on a measurement at the first UE. In some aspects, the first UE may report the inference. In some aspects, the first UE may configure a communication (e.g., a transmit power, a beamforming configuration, a modulation and coding scheme, etc.) based at least in part on the inference. In some aspects, the first UE may determine or store information based at least in part on a position of the first UE determined using the model. In some aspects, the first UE may perform channel tracking based at least in part on the model. In some aspects, the first UE may perform a mobility operation (e.g., handover, reselection, selection of a relay UE) based at least in part on the model.

Example 400 may be useful in a scenario where a RedCap UE and a non-RedCap UE are occasionally close to each other, and the RedCap UE is out of coverage of the network or tries to save power by not directly communicating with the network over a long distance. One use cases of example 400 may include a non-RedCap UE (e.g., a smart phone) approaching RedCap UEs (e.g., asset trackers) in a warehouse or in a cargo truck. For example, the non-RedCap UE may be carried by a warehouse worker or a driver, and the asset trackers can use the assistance provided by the non-RedCap UE.

As described above, example 400 may be suitable when the RedCap UE may not directly use the regular UE's trained model parameters due to a hardware difference such as different number of antennas or antenna arrays (e.g., the non-RedCap UE can have multiple antennas and the RedCap UE can have just one antenna) or for a different coverage range (e.g., the non-RedCap UE can receive multiple reference signals but the RedCap UE can only detect a subset of strong reference signals). This may apply to positioning, channel tracking, mobility decision, or the like.

Figure 5:
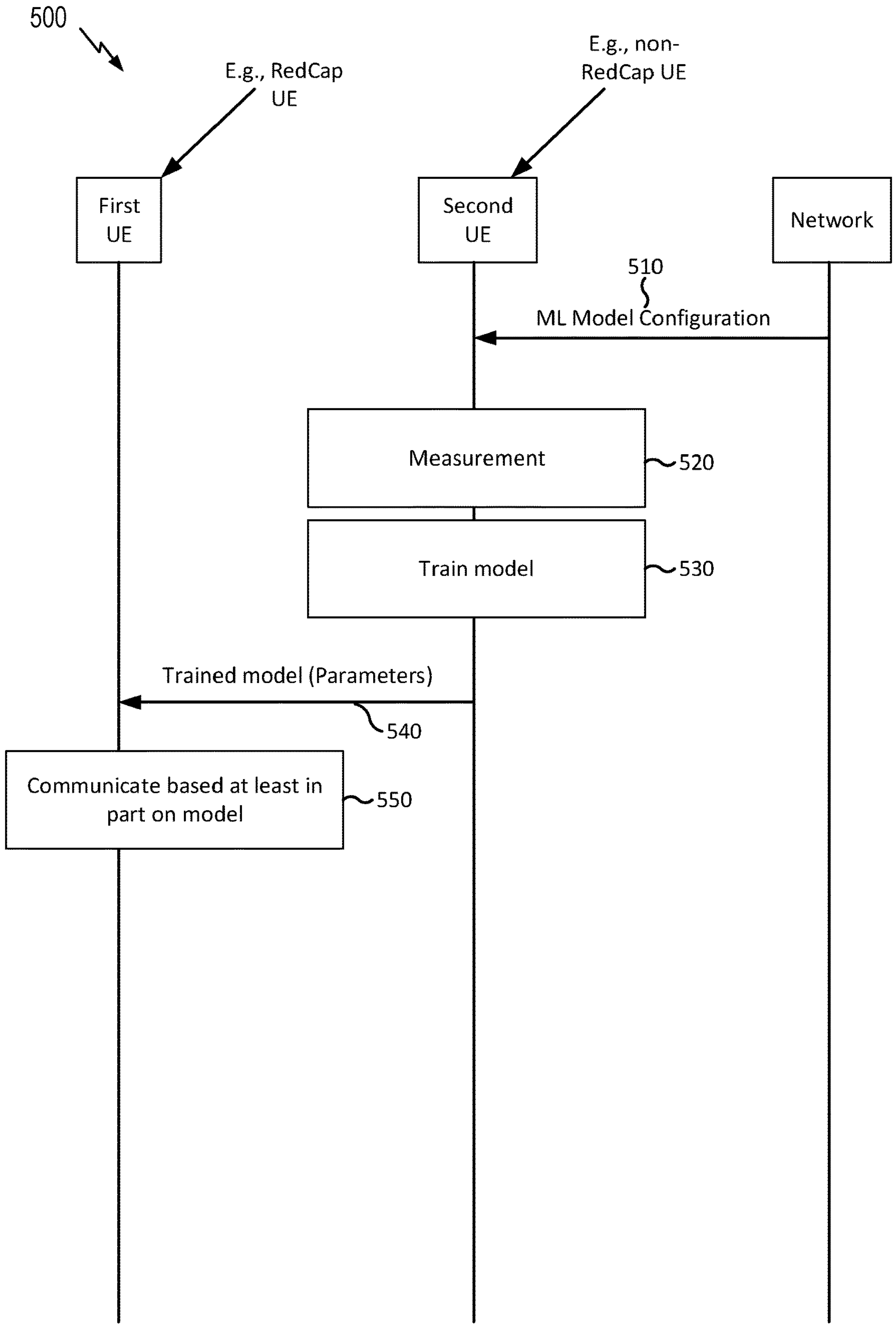
FIG. 5 is a diagram illustrating an example of assistance associated with training a machine learning model.

FIG. 5 is a diagram illustrating an example 500 of assistance associated with training a machine learning model. As shown, example 500 includes a first UE (such as the UE 104), a second UE (such as the UE 104), and a network (such as a base station 102). Example 500 is an example where the second UE provides assistance by training a model for use by the first UE. As shown, in some examples, the first UE may be a RedCap UE, and the second UE may be a non-RedCap UE.

As shown by reference number 510, the network may provide, to the second UE, a configuration for a model. For example, the model may be trained using machine learning. In some examples, the model may be based at least in part on a neural network, though the techniques described herein are not limited to those involving neural networks. In some aspects, the model may be associated with an application. For example, different models may be configured for different applications (e.g., a first model may be configured for channel state feedback determination, and a second model may be configured for positioning). As another example, different models may be configured for the same application. For example, these models may be optimized for different scenarios and/or may have different levels of complexity. As another example, there may be one baseline model to support both indoor and outdoor positioning, and each of indoor positioning and outdoor positioning may also be configured with a separate model specific to indoor positioning or outdoor positioning.

As shown by reference number 520, the second UE may perform a measurement. For example, the second UE may perform measurements used to train the model. In some aspects, the second UE may determine a training set of measurement values based at least in part on the measurements. For example, the second UE may train a positioning model using measurement values indicating a location of the second UE and GPS positioning information indicating the location of the second UE. As another example, the second UE may train a channel condition determination model based at least in part on measurements of different types of reference signals.

In some aspects, the measurement may be based at least in part on a model. For example, for a model associated with beam management, the measurement may include a measured velocity, Doppler information, channel information, or the like. In some aspects, a model may be trained based at least in part on information in addition to or separate from a measurement value. For example, a model associated with beam management may be trained based at least in part on stored beam information. The model associated with beam management may receive information indicating a measured velocity, Doppler information, channel information, and/or stored beam information, and may output a predicted beam.

In some aspects, the second UE may determine an inference based at least in part on the second UE's measurement.

In some aspects, the second UE may determine the inference based at least in part on a model, such as a model trained using machine learning. In some other aspects, the second UE may determine the inference without using a model. In some aspects, an inference may include channel state feedback. In some aspects, an inference may include positioning information. In some aspects, an inference may include information indicating channel conditions. In some aspects, the inference determined by the second UE (or the measurement value determined by the second UE at reference number 520) may correspond to an output of the model being trained by the second UE for the first UE. For example, the second UE may use an output of a first model to train a second model and may provide parameters of the second model to the first UE.

As shown by reference number 530, the second UE may train the model based at least in part on the inference or the measurement value. For example, the second UE may use the measurement value determined at reference number 520 or an inference determined based at least in part on the measurement value to train the model.

As shown by reference number 540, the second UE may provide parameters of the model to the first UE. For example, the second UE may provide a set of parameters that define the model such that the first UE can use the model based at least in part on measurement performed by the first UE. In some aspects, the set of parameters may include a weight for a neural network, a support vector for a support vector machine, a coefficient for a linear regression or a logistic regression, a number of layers of a neural network, a number of neurons of a neural network, a size of a feature in each layer, or the like. Thus, the first UE may conserve processor and battery resources that would otherwise be used to locally train the model.

As shown by reference number 550, the first UE may communicate based at least in part on the model. For example, the first UE may determine an inference using the model based at least in part on a measurement at the first UE. In some aspects, the first UE may report the inference. In some aspects, the first UE may configure a communication (e.g., a transmit power, a beamforming configuration, a modulation and coding scheme, etc.) based at least in part on the inference. In some aspects, the first UE may determine or store information based at least in part on a position of the first UE determined using the model. In some aspects, the first UE may perform channel tracking based at least in part on the model. In some aspects, the first UE may perform a mobility operation (e.g., handover, reselection, selection of a relay UE) based at least in part on the model.

Example 500 may be useful in a situation where a RedCap UE and a non-RedCap UE are close to each other in an environment for a duration of time, such as when the environment has a particular property in comparison to the normal wireless communication environment. For example, example 500 may be useful in a situation where the RedCap UE and the non-RedCap UE are within the same train car or vehicle for several hours. In this case, the RedCap UE (e.g., a child's wearable device) can use the non-RedCap UE (e.g., a cell phone) for assistance with the model.

Figure 6:
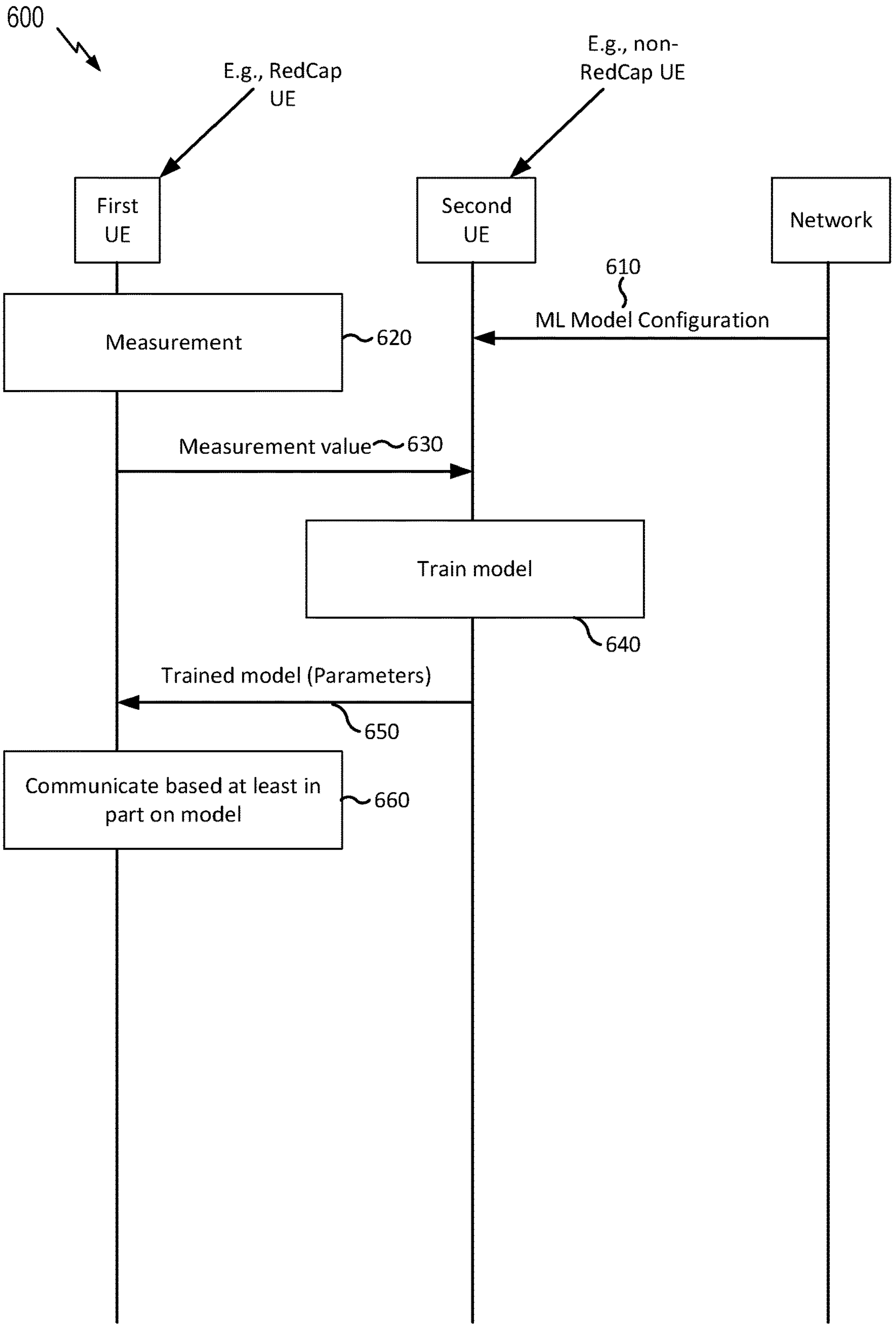
FIG. 6 is a diagram illustrating an example of assistance associated with training a machine learning model.

FIG. 6 is a diagram illustrating an example 600 of assistance associated with training a machine learning model. As shown, example 600 includes a first UE (such as the UE 104), a second UE (such as the UE 104), and a network (such as a base station 102). Example 600 is an example where the second UE provides assistance by training a model for use by the first UE based at least in part on a measurement performed by the first UE. As shown, in some examples, the first UE may be a RedCap UE, and the second UE may be a non-RedCap UE.

As shown by reference number 610, the network may provide, to the second UE, a configuration for a model. For example, the model may be trained using machine learning. In some examples, the model may be based at least in part on a neural network, though the techniques described herein are not limited to those involving neural networks. In some aspects, the model may be associated with an application. For example, different models may be configured for different applications (e.g., a first model may be configured for channel state feedback determination, and a second model may be configured for positioning). As another example, different models may be configured for the same application. For example, these models may be optimized for different scenarios and/or may have different levels of complexity. As another example, there may be one baseline model to support both indoor and outdoor positioning, and each of indoor positioning and outdoor positioning may also be configured with a separate model specific to indoor positioning or outdoor positioning.

As shown by reference number 620, the first UE may perform a measurement. As shown by reference number 630, the first UE may provide information indicating the measurement (e.g., a measurement value of the measurement) to the second UE. As shown by reference number 640, the second UE may use the measurement value to train the model. In some aspects, the second UE may determine a training set of measurement values based at least in part on the measurements. For example, the second UE may train a positioning model using measurement values indicating a location of the first UE (such as based at least in part on a positioning reference signal) and GPS positioning information, determined by the second UE, indicating the location of the second UE. As another example, the second UE may train a channel condition determination model based at least in part on measurements of different types of reference signals by the first UE and by the second UE, such as a demodulation reference signal or a channel state information reference signal. In some aspects, the measurement value may include a Layer 3 measurement value (e.g., associated with time based filtration), such as a received signal strength indicator or a reference signal received power. By training the model at the second UE, processing resources and battery resources of the first UE may be conserved.

In some aspects, the first UE may determine an inference based at least in part on the first UE's measurement prior to providing the measurement value to the second UE. For example, the first UE may determine the inference based at least in part on a model and may provide the inference to the second UE. The second UE may use the inference to train the model and may provide an updated set of parameters for the model to the first UE. In some aspects, an inference may include channel state feedback. In some aspects, an inference may include positioning information. In some aspects, an inference may include information indicating channel conditions. Thus, the second UE may update the model (thereby improving accuracy of the model) based at least in part on the inference provided by the first UE.

As shown by reference number 650, the second UE may provide parameters of the model to the first UE. For example, the second UE may provide a set of parameters that define the model such that the first UE can use the model based at least in part on measurement performed by the first UE. In some aspects, the set of parameters may include a weight for a neural network, a support vector for a support vector machine, a coefficient for a linear regression or a logistic regression, or the like. Thus, the first UE may conserve processor and battery resources that would otherwise be used to locally train the model.

As shown by reference number 660, the first UE may communicate based at least in part on the model. For example, the first UE may determine an inference using the model based at least in part on a measurement at the first UE. In some aspects, the first UE may report the inference. In some aspects, the first UE may configure a communication (e.g., a transmit power, a beamforming configuration, a modulation and coding scheme, etc.) based at least in part on the inference. In some aspects, the first UE may determine or store information based at least in part on a position of the first UE determined using the model. In some aspects, the first UE may perform channel tracking based at least in part on the model. In some aspects, the first UE may perform a mobility operation (e.g., handover, reselection, selection of a relay UE) based at least in part on the model.

In this way, the first UE may conserve processor and power resources associated with training a model and may reduce power consumption associated with communicating directly with the network (such as to communicate the model with the network).

Figure 7:
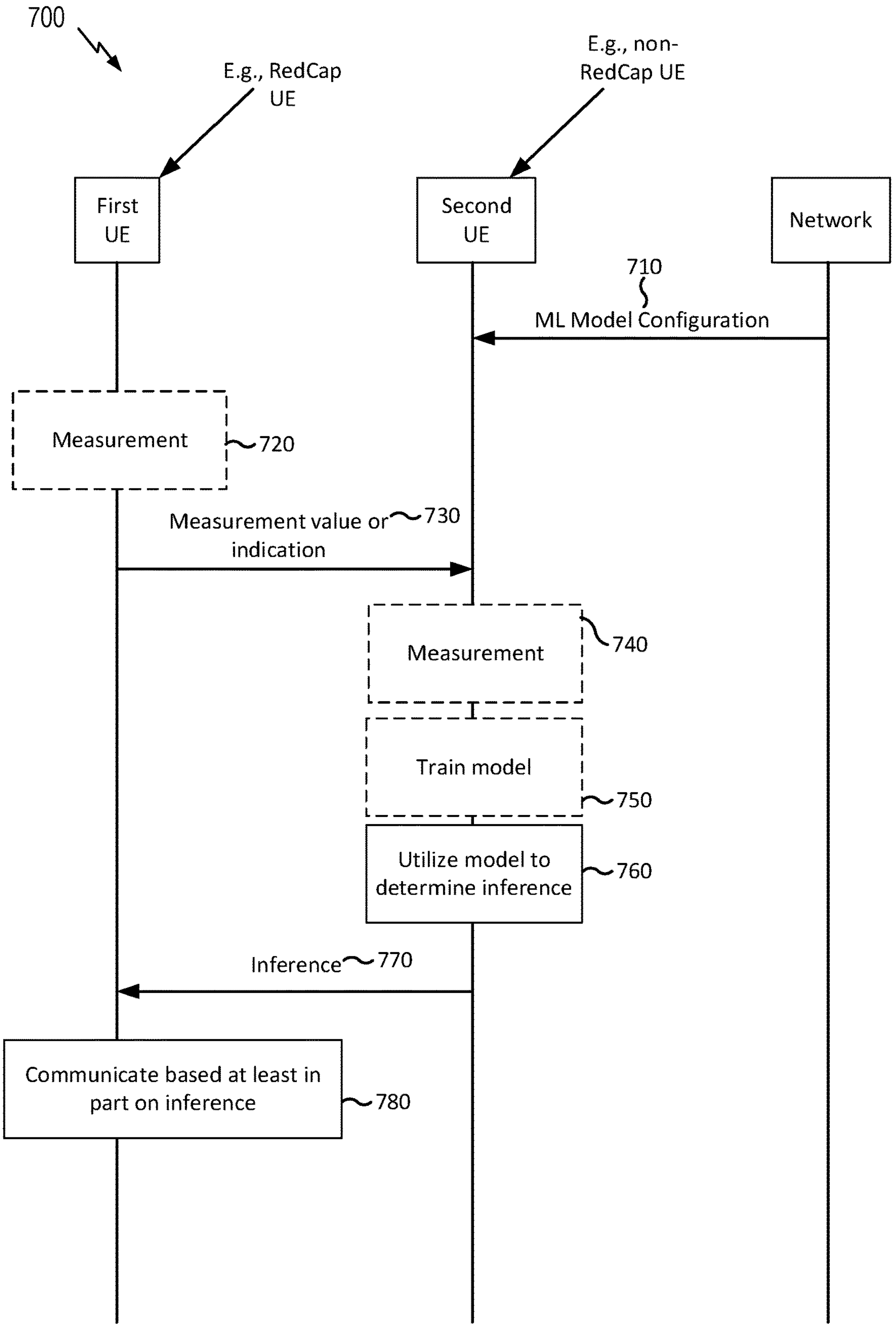
FIG. 7 is a diagram illustrating an example of assistance associated with measurement or training a machine learning model.

FIG. 7 is a diagram illustrating an example 700 of assistance associated with measurement or training a machine learning model. In example 700, the model is trained at the second UE. In some aspects, a first UE performs a measurement used to train the model. In some other aspects, a first UE provides an indication of a measurement for a second UE to perform to train the model. As shown, example 700 includes a first UE (such as the UE 104), a second UE (such as the UE 104), and a network (such as a base station 102). Example 700 is an example where the second UE provides assistance by training a model for use by the first UE based at least in part on a measurement performed by the first UE or an indication of a measurement to be performed by the second UE. As shown, in some examples, the first UE may be a RedCap UE, and the second UE may be a non-RedCap UE.

As shown by reference number 710, the network may provide, to the second UE, a configuration for a model. For example, the model may be trained using machine learning. In some examples, the model may be based at least in part on a neural network, though the techniques described herein are not limited to those involving neural networks. In some aspects, the model may be associated with an application. For example, different models may be configured for different applications (e.g., a first model may be configured for channel state feedback determination, and a second model may be configured for positioning). As another example, different models may be configured for the same application. For example, these models may be optimized for different scenarios and/or may have different levels of complexity. As another example, there may be one baseline model to support both indoor and outdoor positioning, and each of indoor positioning and outdoor positioning may also be configured with a separate model specific to indoor positioning or outdoor positioning.

As shown by reference number 720, in some aspects, the first UE may perform a measurement. The measurement may include any one or more of the measurements described elsewhere herein. As shown by reference number 730, the first UE may provide information indicating the measurement (e.g., a measurement value of the measurement), or an indication of a measurement to be performed by the second UE, to the second UE. For example, if the first UE performs the measurement indicated by reference number 720, then the first UE may provide a measurement value based at least in part on the measurement to the second UE. Additionally, or alternatively, the first UE may provide an indication of a measurement to be performed by the second UE.

The indication of the measurement to be performed by the second UE may include, for example, information indicating a type of the measurement, information indicating a target of the measurement, and information indicating a feature of the measurement. The type of the measurement may indicate a type of measurement value to be determined (e.g., downlink estimated channel, reference signal received power, or the like). The target of the measurement may indicate an inference to be determined using the measurement value (e.g., positioning, channel state feedback, channel estimation, or the like). The feature of the measurement may indicate one or more objects or resources on which the measurement is to be performed (e.g., bandwidth information, an associated cell list, or the like).

In some aspects, the indication may include one or more parameters. For example, the indication may include a parameter indicating Doppler information, which may indicate, to the second UE, that the measurement is associated with a high mobility scenario. Thus, the second UE may perform a measurement and train a model associated with a high mobility scenario. As another example, the indication may include a parameter indicating rank information, such as a parameter indicating a rank associated with a. The second UE may train the model based at least in part on the rank information (such as for determining channel conditions associated with the rank information.

As shown by reference number 740, the second UE may optionally perform a measurement. For example, if the second UE receives an indication of a measurement to be performed by the second UE, the second UE may perform the measurement in accordance with the indication.

As shown by reference number 750, the second UE may optionally use the measurement value to train the model (e.g., a measurement value received from the first UE and/or a measurement value determined by the second UE). In some aspects, the second UE may determine a training set of measurement values based at least in part on the measurement values. the second UE may train a positioning model using measurement values indicating a location of the first UE and GPS positioning information, determined by the second UE, indicating the location of the second UE. As another example, the second UE may train a channel condition determination model based at least in part on measurements of different types of reference signals by the first UE and by the second UE. By training the model at the second UE, processing resources and battery resources of the first UE may be conserved. In some aspects, the second UE may use measurement values provided by the first UE to train the model, with measurement values determined by the second UE (such as based at least in part on the indication shown by reference number 730) being used as a ground truth for training the model. In some aspects, the second UE may perform the operations of example 700 without training the model or may use a previously trained model to perform the operations of example 700.

As shown by reference number 760, the second UE may determine an inference using the model. For example, the second UE may determine the inference based at least in part on the measurement value provided by the first UE (if a measurement value was provided by the UE) and/or based at least in part on the measurement performed by the second UE at reference number 740 (if the second UE performed such a measurement). The second UE may use the measurement value as an input to the model, and the model may output the inference (or may output information used to determine the inference). As shown by reference number 770, the second UE may provide information indicating the inference to the first UE. For example, the second UE may provide the information indicating the inference via a local link with the first UE, or via the network.

As shown by reference number 780, the first UE may communicate based at least in part on the model. In some aspects, the first UE may configure a communication (e.g., a transmit power, a beamforming configuration, a modulation and coding scheme, etc.) based at least in part on the inference. In some aspects, the first UE may determine or store information based at least in part on a position of the first UE determined using the model. In some aspects, the first UE may perform channel tracking based at least in part on the model. In some aspects, the first UE may perform a mobility operation (e.g., handover, reselection, selection of a relay UE) based at least in part on the model.

In this way, the first UE may conserve processor and power resources associated with utilizing a model and/or performing a measurement and may reduce power consumption associated with communicating directly with the network.

Figure 8:
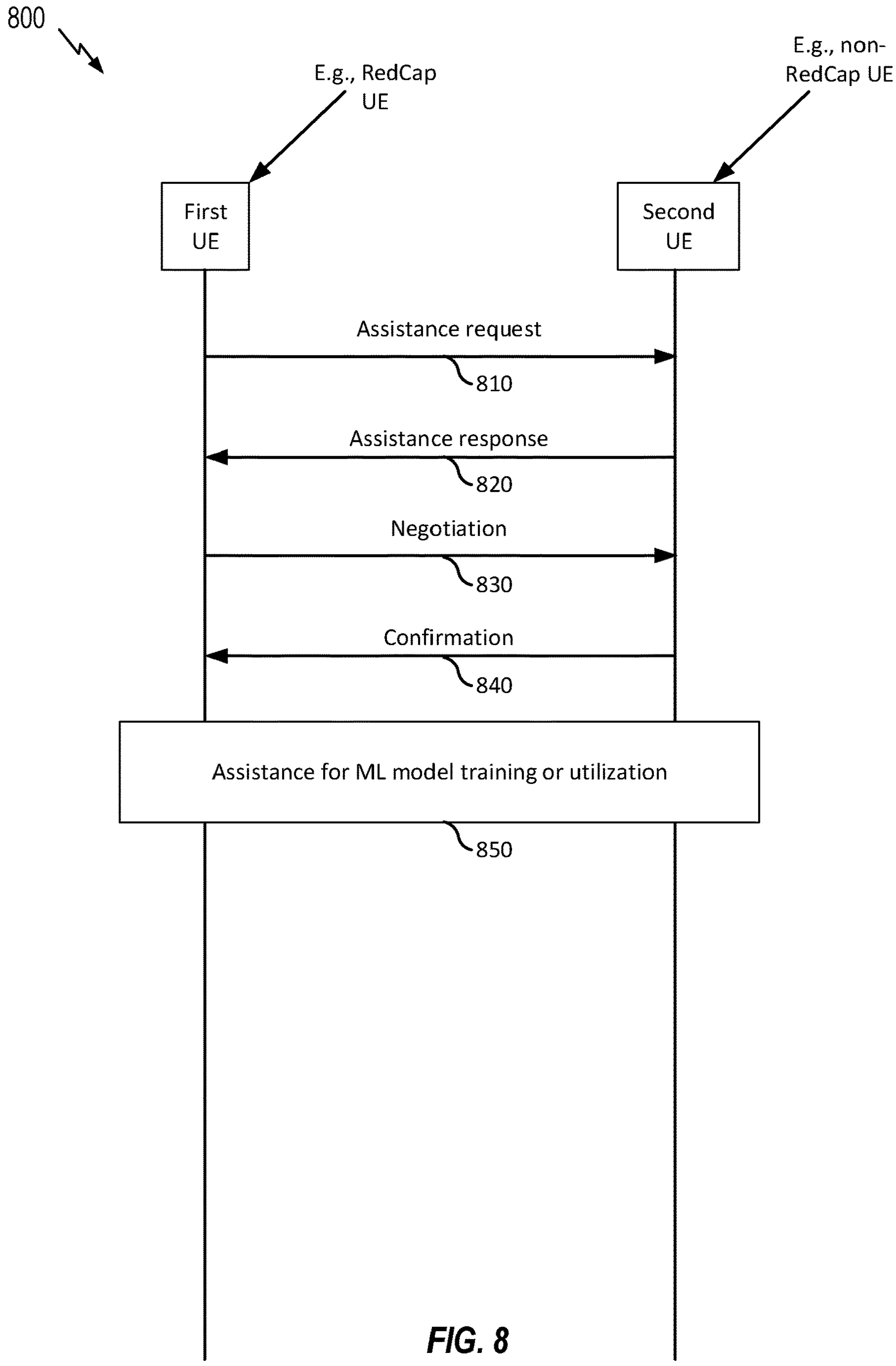
FIG. 8 is a diagram illustrating an example of signaling associated with requesting assistance for training or utilizing a machine learning model.

FIG. 8 is a diagram illustrating an example 800 of signaling associated with requesting assistance for training or utilizing a machine learning model. In example 800, a first UE initiates assistance from a second UE by requesting the assistance. As shown, example 800 includes a first UE (such as the UE 104) and a second UE (such as the UE 104). As shown, in some examples, the first UE may be a RedCap UE and the second UE may be a non-RedCap UE.

As shown by reference number 810, the first UE may transmit a request for assistance relating to training or utilizing a model. For example, the first UE may transmit a request for assistance with training or utilizing the model using machine learning. In some aspects, the first UE may transmit the request so that a single second UE receives the request (e.g., via unicast signaling). In some aspects, the first UE may transmit the request so that multiple second UEs receive the request (e.g., via groupcast, multicast, or broadcast signaling). In some aspects, the first UE may transmit the request to UEs within a range of the UE (e.g., UEs within a distance of the UE).

As shown by reference number 820, the first UE may receive a response (referred to herein as an assistance response or assistance information) from the second UE. The response may indicate whether the second UE is configured to provide assistance with training or utilizing the model. In some aspects, the response may indicate that the second UE will provide assistance with training or utilizing the model.

As shown by reference number 830, the first UE may negotiate regarding the assistance with the second UE. For example, the negotiation may indicate one or more parameters for the assistance, such as a particular approach for the assistance (e.g., one or more of the approaches described in examples 400, 500, 600, and 700), a time frame for the assistance, a particular model for which assistance is to be provided, or the like. In some aspects, if the first UE receives multiple responses at reference number 820 (such as from multiple second UEs), the first UE may select a second UE of the multiple UEs based at least in part on the negotiation. As shown by reference number 840, the first UE may receive, from the second UE, a confirmation message. The confirmation message may indicate that the second UE will provide assistance with training or utilizing the model. For example, the confirmation message may indicate that the negotiation (e.g., the parameters indicated by the negotiation) is accepted by the second UE.

As shown by reference number 850, the second UE may provide assistance to the first UE. In some aspects, the first UE and the second UE may perform the operations described with regard to example 400. In some aspects, the first UE and the second UE may perform the operations described with regard to example 500. In some aspects, the first UE and the second UE may perform the operations described with regard to example 600. In some aspects, the first UE and the second UE may perform the operations described with regard to example 700. In some aspects, the first UE and the second UE may perform a combination of the operations described with regard to examples 400, 500, 600, and 700.

Figure 9:
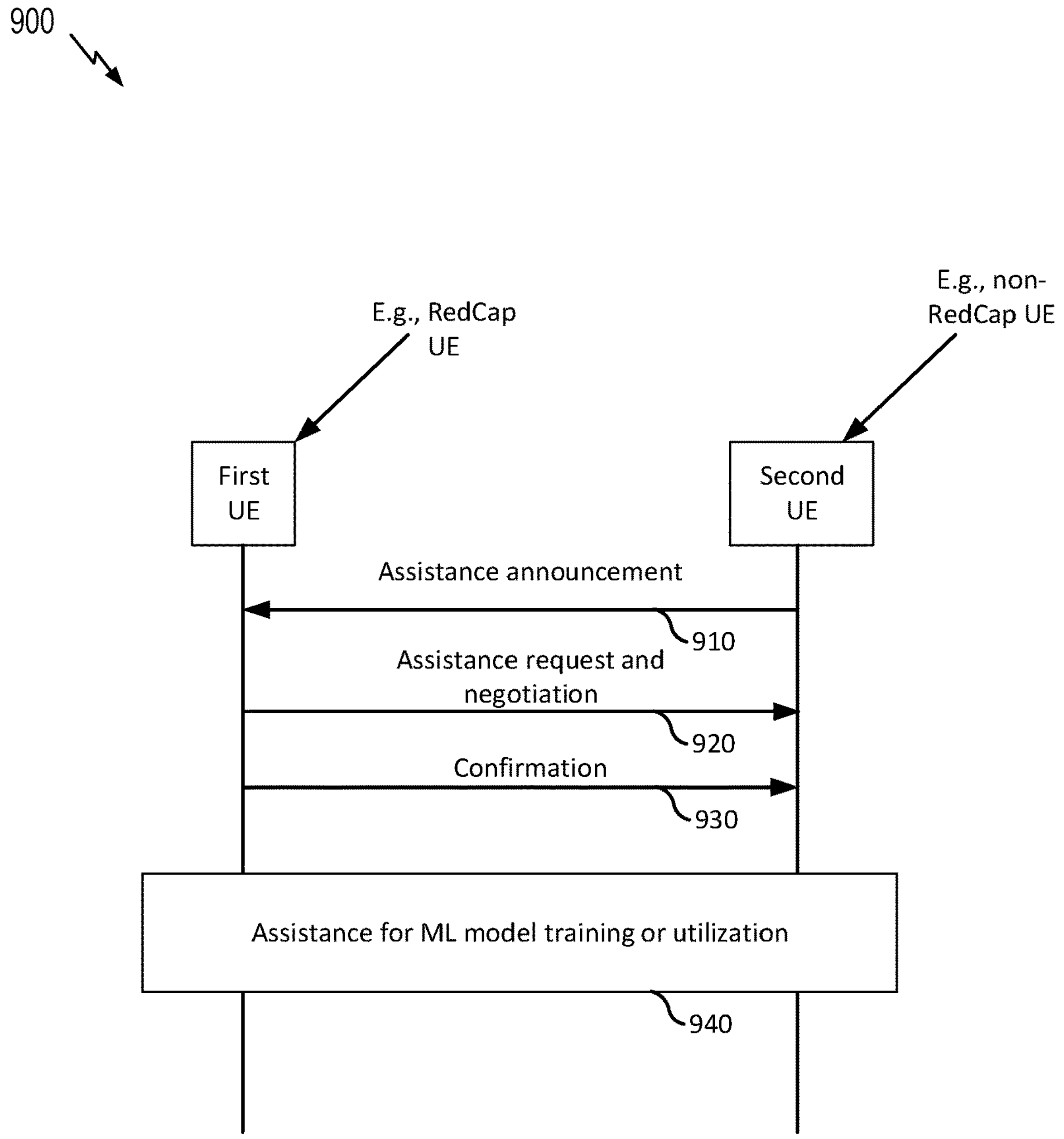
FIG. 9 is a diagram illustrating an example of signaling associated with announcing assistance for training or utilizing a machine learning model.

FIG. 9 is a diagram illustrating an example 900 of signaling associated with announcing assistance for training or utilizing a machine learning model. In example 900, a second UE initiates assistance for a first UE by announcing the assistance. As shown, example 900 includes a first UE (such as the UE 104) and a second UE (such as the UE 104). As shown, in some examples, the first UE may be a RedCap UE and the second UE may be a non-RedCap UE.

As shown by reference number 910, the second UE may transmit an assistance announcement indicating that the second UE can provide assistance for training or utilization of a model. In some aspects, the second UE may transmit the request so that a single first UE receives the request (e.g., via unicast signaling). In some aspects, the second UE may transmit the announcement so that multiple first UEs receive the request (e.g., via groupcast, multicast, or broadcast signaling). In some aspects, the second UE may transmit the request to UEs within a range of the second UE (e.g., UEs within a threshold distance of the second UE). The assistance announcement may be referred to herein as assistance information.

As shown by reference number 920, the second UE may receive a response from the first UE. The response may include an assistance request (which may request assistance with training or utilizing a model) based at least in part on the assistance announcement. As further shown, the first UE may negotiate regarding the assistance with the second UE. For example, the negotiation (such as in the assistance request or separate from the assistance request) may indicate one or more parameters for the assistance, such as a particular approach for the assistance (e.g., one or more of the approaches described in examples 400, 500, 600, and 700), a time frame for the assistance, a particular model for which assistance is to be provided, or the like. As shown by reference number 930, the first UE may receive, from the second UE, a confirmation message. The confirmation message may indicate that the second UE will provide assistance with training or utilizing the model. For example, the confirmation message may indicate that the negotiation (e.g., the parameters indicated by the negotiation) is accepted by the second UE.

As shown by reference number 940, the second UE may provide assistance to the first UE. In some aspects, the first UE and the second UE may perform the operations described with regard to example 400. In some aspects, the first UE and the second UE may perform the operations described with regard to example 500. In some aspects, the first UE and the second UE may perform the operations described with regard to example 600. In some aspects, the first UE and the second UE may perform the operations described with regard to example 700. In some aspects, the first UE and the second UE may perform a combination of the operations described with regard to examples 400, 500, 600, and 700.

Figure 10:
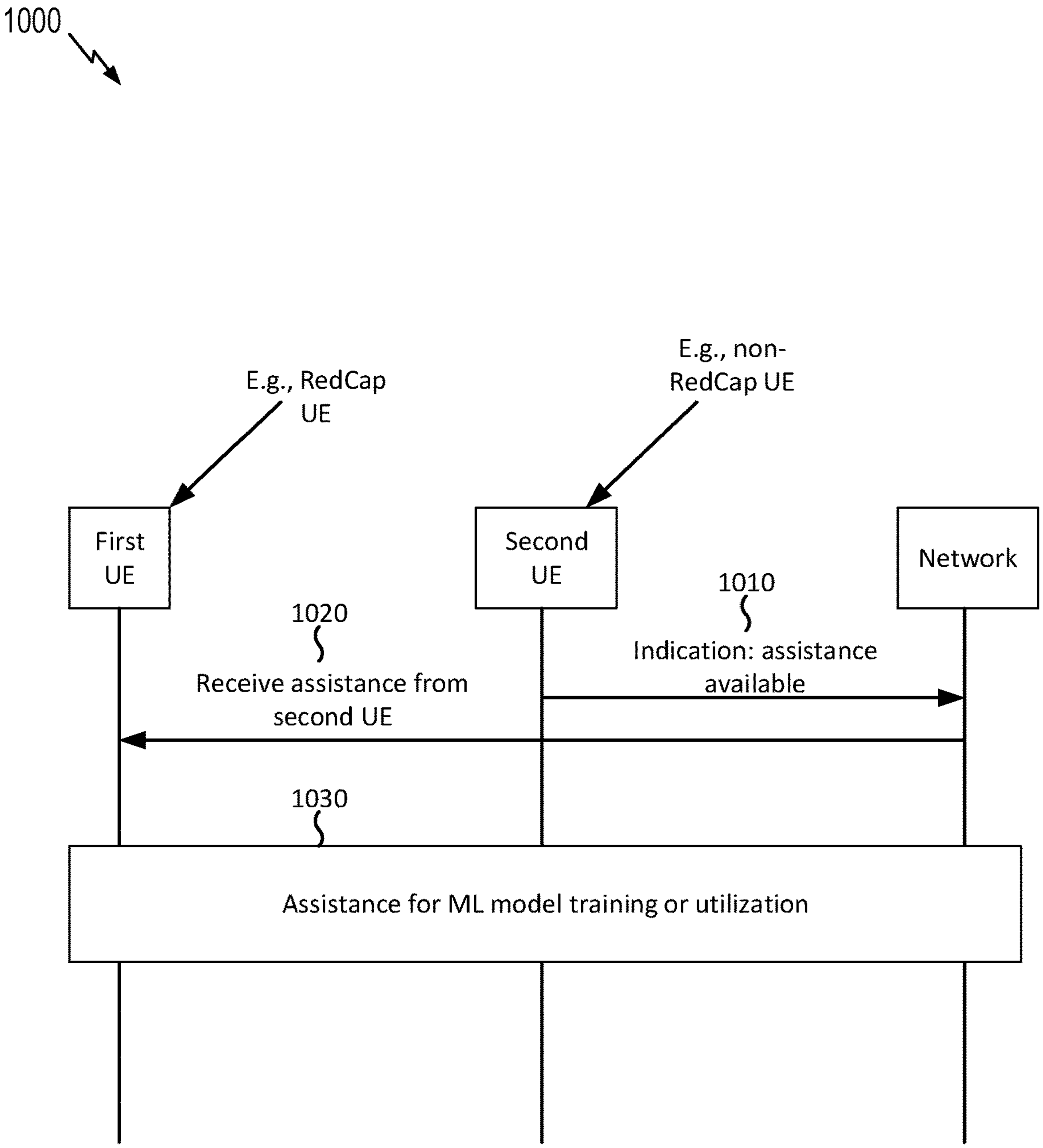
FIG. 10 is a diagram illustrating an example of networking signaling associated with configuring assistance for training or utilizing a machine learning model.

FIG. 10 is a diagram illustrating an example 1000 of networking signaling associated with configuring assistance for training or utilizing a machine learning model. In example 1000, a network indicates a second UE to provide assistance for a first UE. As shown, example 1000 includes a first UE (such as the UE 104), a second UE (such as the UE 104), and a network (such as a base station 102). As shown, in some examples, the first UE may be a RedCap UE and the second UE may be a non-RedCap UE.

As shown by reference number 1010, the second UE may transmit, to the network, an indication of whether the second UE is configured to provide assistance for training or utilization of a model. In some aspects, the second UE may transmit the indication via capability signaling (such as UE capability information). For example, the second UE may transmit the indication via UE capability report signaling. The UE capability report signaling may be a radio resource control (RRC) message transmitted to the network during a UE initial registration process. Thus, the indication as transmitted via capability signaling may be considered semi-static. Additionally, or alternatively, the second UE may transmit the indication via assistance information. For example, the second UE may transmit the indication via UE assistance information. The UE assistance information may be considered dynamic signaling. In some aspects, the second UE may transmit the indication based at least in part on a condition at the second UE. For example, the second UE may transmit the indication if a battery power of the second UE satisfies a threshold. As shown by reference number 1020, the network may transmit, to the first UE, an indication that the second UE can provide assistance with training or utilization of a model. For example, the network may transmit assistance information to the first UE.

In some aspects, the first UE may negotiate regarding the assistance with the second UE. For example, the negotiation (such as in the assistance request or separate from the assistance request) may indicate one or more parameters for the assistance, such as a particular approach for the assistance (e.g., one or more of the approaches described in examples 400, 500, 600, and 700), a time frame for the assistance, a particular model for which assistance is to be provided, or the like. In some aspects, the first UE may receive, from the second UE, a confirmation message. The confirmation message may indicate that the second UE will provide assistance with training or utilizing the model. For example, the confirmation message may indicate that the negotiation (e.g., the parameters indicated by the negotiation) is accepted by the second UE.

As shown by reference number 1030, the second UE may provide assistance to the first UE. In some aspects, the first UE and the second UE may perform the operations described with regard to example 400. In some aspects, the first UE and the second UE may perform the operations described with regard to example 500. In some aspects, the first UE and the second UE may perform the operations described with regard to example 600. In some aspects, the first UE and the second UE may perform the operations described with regard to example 700. In some aspects, the first UE and the second UE may perform a combination of the operations described with regard to examples 400, 500, 600, and 700.

Figure 11:
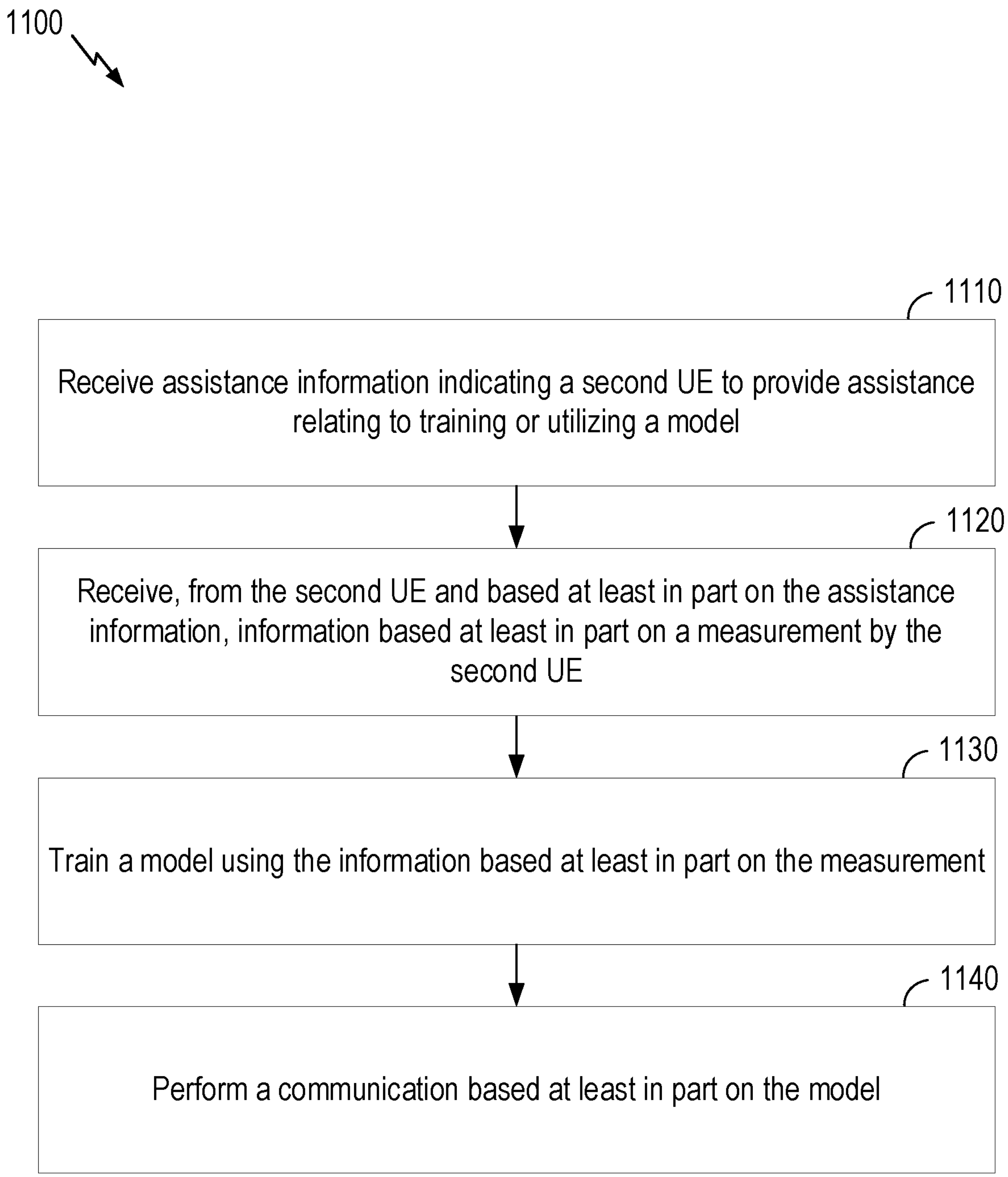
FIG. 11 is a diagram illustrating an example process performed, for example, by a UE.

FIG. 11 is a diagram illustrating an example process 1100 performed, for example, by a UE. The example process 1100 may be performed, for example, by the second UE of FIGS.

4-10. As shown in FIG. 11, in some aspects, process 1100 may include receiving assistance information indicating a second UE to provide assistance relating to training or utilizing a model (block 1110). In some aspects, process 1100 may include receiving, from the second UE and based at least in part on the assistance information, information based at least in part on a measurement by the second UE (block 1120). In some aspects, process 1100 may include training a model using the information based at least in part on the measurement (block 1130). In some aspects, process 1100 may include performing a communication based at least in part on the model (block 1140).

Figure 12:
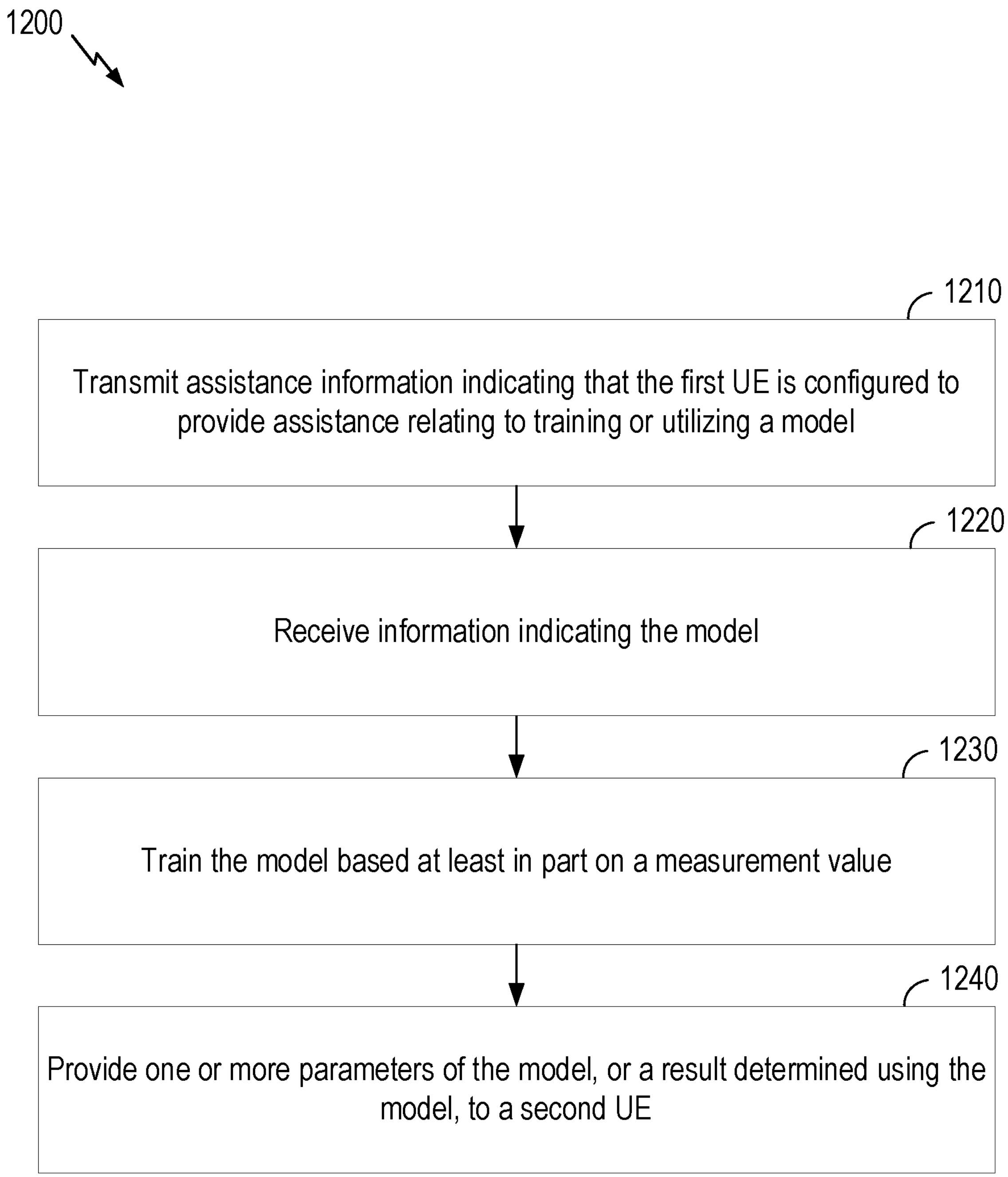
FIG. 12 is a diagram illustrating an example process performed, for example, by a UE.

FIG. 12 is a diagram illustrating an example process 1200 performed, for example, by a UE. The example process 1200 may be performed, for example, by the first UE of FIGS. 4-10. As shown in FIG. 12, in some aspects, process 1200 may include transmitting assistance information indicating that the first UE is configured to provide assistance relating to training or utilizing a model (block 1210). In some aspects, process 1200 may include receiving information indicating the model (block 1220). In some aspects, process 1200 may include training the model based at least in part on a measurement value (block 1230). In some aspects, process 1200 may include providing one or more parameters of the model, or a result determined using the model, to a second UE (block 1240).

Example Wireless Communication Devices

Figure 13:
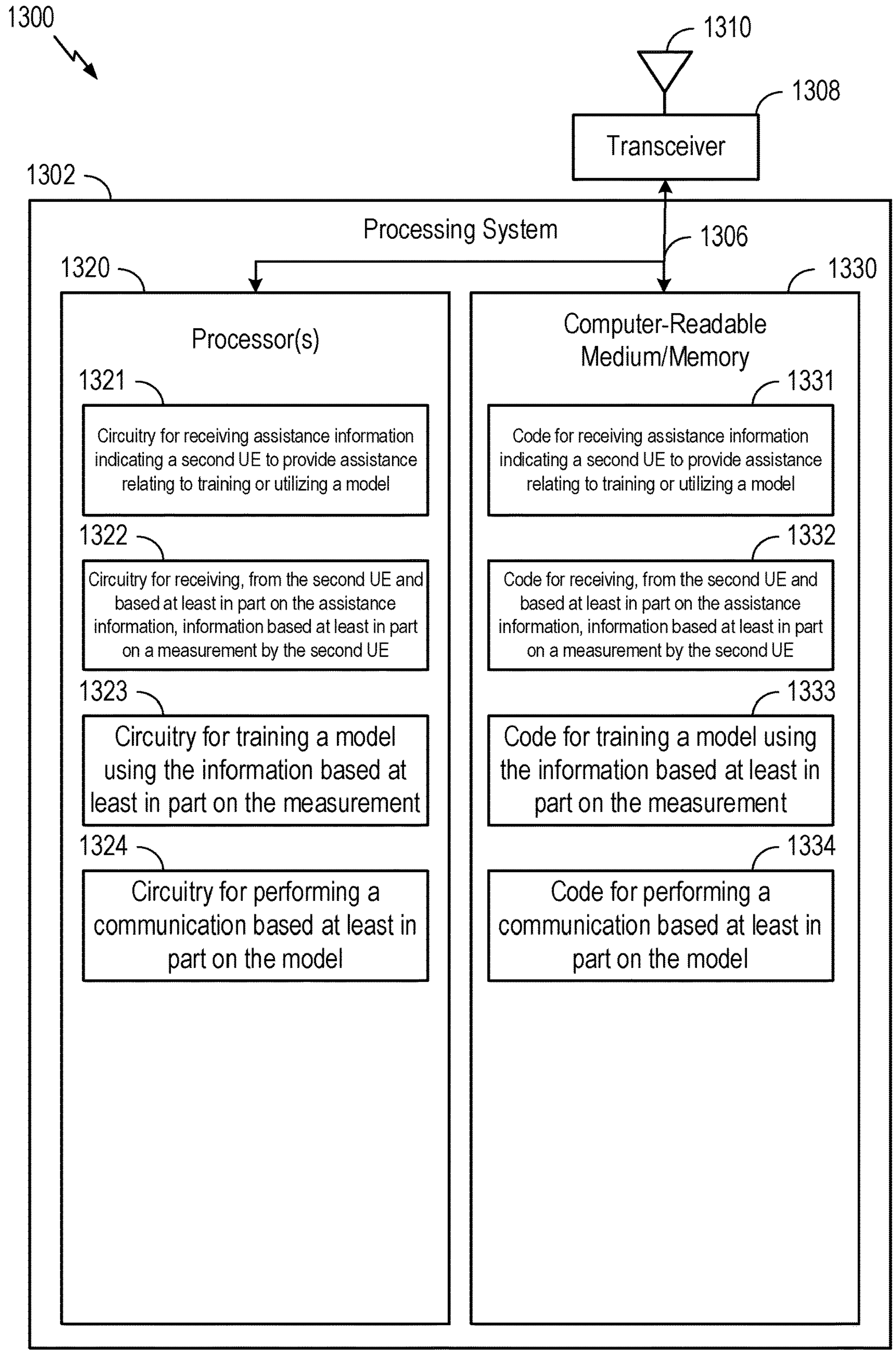
FIG. 13 depicts aspects of an example communications device.

FIG. 13 depicts an example communications device 1300 that includes various components operable, configured, or adapted to perform operations for the techniques disclosed herein, such as the operations depicted and described with respect to FIGS. 4-12. In some examples, communication device 1300 may be a UE 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 4-12, or other operations for performing the various techniques discussed herein for receiving assistance for machine learning based modeling.

In the depicted example, computer-readable medium/memory 1330 stores code 1331 for receiving assistance information indicating a second UE to provide assistance relating to training or utilizing a model, code 1332 for receiving, from the second UE and based at least in part on the assistance information, information based at least in part on a measurement by the second UE, code 1333 for training a model using the information based at least in part on the measurement, and code 1334 for performing a communication based at least in part on the model.

In the depicted example, the one or more processors 1320 include circuitry configured to implement the code stored in the computer-readable medium/memory 1330, including circuitry 1321 for receiving assistance information indicating a second UE to provide assistance relating to training or utilizing a model, circuitry 1322 for receiving, from the second UE and based at least in part on the assistance information, information based at least in part on a measurement by the second UE, circuitry 1323 for training a model using the information based at least in part on the measurement, and circuitry 1324 for performing a communication based at least in part on the model.

Various components of communications device 1300 may provide means for performing the methods described herein, including with respect to FIGS. 4-12.

In some examples, means for transmitting or sending (or means for outputting for transmission) may include the transceivers 254 and/or antenna(s) 252 of the user equipment 104 illustrated in FIG. 2 and/or transceiver 1308 and antenna 1310 of the communication device 1300 in FIG. 13.

In some examples, means for transmitting or sending (or means for outputting for transmission) may include the transceivers 254 and/or antenna(s) 252 of the user equipment 104 illustrated in FIG. 2 and/or transceiver 1308 and antenna 1310 of the communication device 1300 in FIG. 13.

In some examples, means for receiving assistance information indicating a second UE to provide assistance relating to training or utilizing a model, means for receiving, from the second UE and based at least in part on the assistance information, information based at least in part on a measurement by the second UE, means for training a model using the information based at least in part on the measurement, and means for performing a communication based at least in part on the model may include various processing system components, such as: the one or more processors 1320 in FIG. 13, or aspects of the user equipment 104 depicted in FIG. 2, including receive processor 258, transmit processor 264, TX MIMO processor 266, and/or controller/processor 280 (including communication manager 281).

Notably, FIG. 13 is an example, and many other examples and configurations of communication device 1300 are possible.

Figure 14:
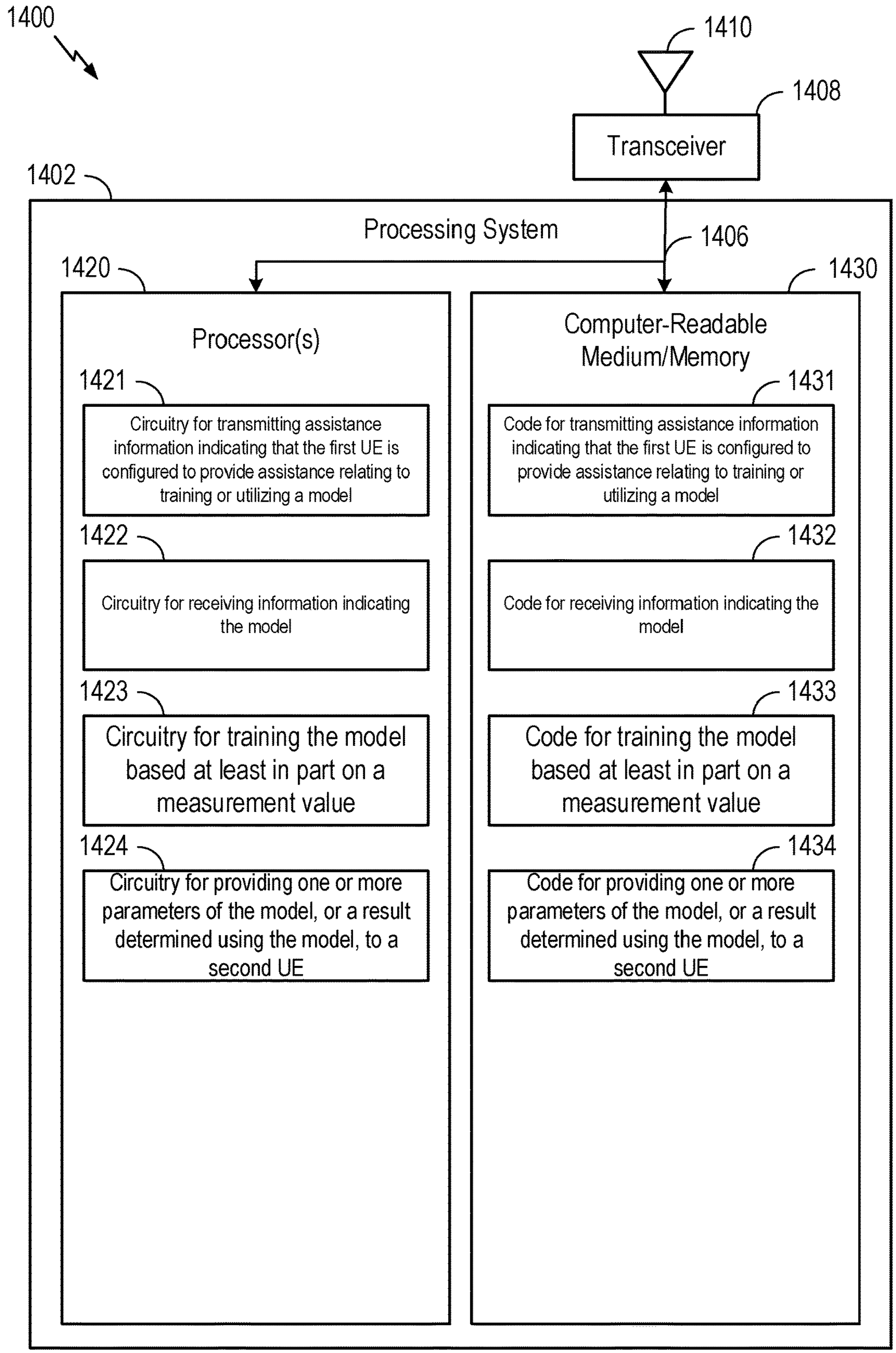
FIG. 14 depicts aspects of an example communications device.

FIG. 14 depicts an example communications device 1400 that includes various components operable, configured, or adapted to perform operations for the techniques disclosed herein, such as the operations depicted and described with respect to FIGS. 4-12. In some examples, communication device 1400 may be a user equipment 104 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIGS. 4-12, or other operations for performing the various techniques discussed herein for transmit or receive assistance information; receive or determine information based at least in part on a measurement; train a model; perform a communication; provide one or more parameters of the model; and/or provide a result.

In the depicted example, computer-readable medium/memory 1430 stores code 1431 for transmitting assistance information indicating that the first UE is configured to provide assistance relating to training or utilizing a model, code 1432 for receiving information indicating the model, code 1433 for training the model based at least in part on a measurement value, and code 1434 for providing one or more parameters of the model, or a result determined using the model, to a second UE.

In the depicted example, the one or more processors 1420 include circuitry configured to implement the code stored in the computer-readable medium/memory 1430, including circuitry 1421 for transmitting assistance information indicating that the first UE is configured to provide assistance relating to training or utilizing a model, circuitry 1422 for receiving information indicating the model, circuitry 1423 for training the model based at least in part on a measurement value, and circuitry 1424 for providing one or more parameters of the model, or a result determined using the model, to a second UE.

Various components of communications device 1400 may provide means for performing the methods described herein, including with respect to FIGS. 4-12.

In some examples, means for transmitting or sending (or means for outputting for transmission) may include the transceivers 254 and/or antenna(s) 252 of the user equipment 104 illustrated in FIG. 2 and/or transceiver 1408 and antenna 1410 of the communication device 1400 in FIG. 14.

In some examples, means for receiving (or means for obtaining) may include the transceivers 254 and/or antenna (s) 252 of the user equipment 104 illustrated in FIG. 2 and/or transceiver 1408 and antenna 1410 of the communication device 1400 in FIG. 14.

In some examples, means for transmitting assistance information indicating that the first UE is configured to provide assistance relating to training or utilizing a model, means for receiving information indicating the model, means for training the model based at least in part on a measurement value, and means for providing one or more parameters of the model, or a result determined using the model, to a second UE may include various processing system components, such as: the one or more processors 1420 in FIG. 14, or aspects of the user equipment 104 depicted in FIG. 2, including receive processor 258, transmit processor 264, TX MIMO processor 266, and/or controller/processor 280 (including communication manager 281).

Notably, FIG. 14 is an example, and many other examples and configurations of communication device 1400 are possible.

Example Clauses

Implementation examples are described in the following numbered clauses:

Clause 1: A method of wireless communication performed by a first user equipment (UE), comprising: receiving assistance information indicating a second UE to provide assistance relating to training or utilizing a model; receiving, from the second UE and based at least in part on the assistance information, information based at least in part on a measurement by the second UE; training a model using the information based at least in part on the measurement; and performing a communication based at least in part on the model.

Clause 2: The method of Clause 1, wherein the information based at least in part on measurement includes an inference based at least in part on the measurement by the second UE, and wherein training the model further comprises training the model using the information based at least in part on the measurement as a ground truth.

Clause 3: The method of any of Clauses 1-2, wherein the first UE is associated with a reduced capability relative to the second UE.

Clause 4: The method of any of Clauses 1-3, wherein receiving the assistance information is based at least in part on a configuration of the first UE being incompatible with the model.

Clause 5: The method of Clause 4, wherein the configuration of the first UE is incompatible with the model based at least in part on at least one of: a number of antennas of the first UE, a positioning capability of the first UE, or a coverage range of the first UE.

Clause 6: The method of any of Clauses 1-5, wherein the assistance information is received from the second UE.

Clause 7: The method of any of Clauses 1-6, wherein the assistance information is received from a base station.

Clause 8: The method of any of Clauses 1-7, further comprising: transmitting a request for the assistance relating to training or utilizing the model, wherein receiving the assistance information is based at least in part on the request.

Clause 9: The method of any of Clauses 1-8, wherein receiving the assistance information is based at least in part on establishing a connection with the second UE.

Clause 10: The method of any of Clauses 1-9, further comprising: receiving, from a base station prior to training the model, information indicating the model.

Clause 11: A method of wireless communication performed by a first user equipment (UE), comprising: transmitting assistance information indicating that the first UE is configured to provide assistance relating to training or utilizing a model; receiving information indicating the model; training the model based at least in part on a measurement value; and providing one or more parameters of the model, or a result determined using the model, to a second UE.

Clause 12: The method of Clause 11, further comprising: receiving information indicating the measurement value from the second UE.

Clause 13: The method of any of Clauses 11-12, further comprising: receiving, from the second UE, an indication to perform a measurement; and determining the measurement value based at least in part on the measurement.

Clause 14: The method of Clause 13, wherein the indication identifies at least one of: a type of the measurement, a target for the measurement value, or a feature for which the measurement is to be performed.

Clause 15: The method of any of Clauses 11-14, wherein the measurement value is an input to the model and the result is an output of the model that is based at least in part on the measurement value.

Clause 16: The method of any of Clauses 11-15, wherein the assistance information is transmitted to the second UE.

Clause 17: The method of any of Clauses 11-16, wherein the assistance information is transmitted to a base station.

Clause 18: The method of Clause 17, wherein the assistance information is transmitted via UE capability signaling.

Clause 19: The method of Clause 17, wherein the assistance information is transmitted based at least in part on a condition associated with the first UE.

Clause 20: The method of Clause 19, wherein the condition is based at least in part on a battery power associated with the first UE.

Clause 21: The method of any of Clauses 11-20, wherein transmitting the assistance information is based at least in part on a request, received from the second UE, for the assistance relating to training or utilizing the model.

Clause 22: The method of any of Clauses 11-21, wherein transmitting the assistance information is based at least in part on establishing a connection with the second UE.

Clause 23: The method of any of Clauses 11-22, wherein transmitting the assistance information is based at least in part on the first UE and the second UE being located in an environment for a threshold length of time.

Clause 24: The method of any of Clauses 11-23, wherein the second UE is associated with a reduced capability relative to the first UE.

Clause 25: An apparatus, comprising: a memory comprising executable instructions; one or more processors configured to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by one or more processors of an apparatus, cause the apparatus to perform a method in accordance with any one of Clauses 1-24.

Clause 28: A computer program product embodied on a computer-readable storage medium comprising code for performing a method in accordance with any one of Clauses 1-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as base station 180 may operate in a traditional sub-6 GHz spectrum, in millimeter wave (mmWave) frequencies, and/or near mmWave frequencies in communication with the UE 104. When the gNB 180 operates in mm Wave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a packet switched (PS) Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for orthogonal frequency division multiplexing (OFDM)) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UF. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of assistance between UEs for machine learning in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms “network” and “system” are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G radio access), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named “3rd Generation Partnership Project” (3GPP). cdma2000 and UMB are described in documents from an organization named “3rd Generation Partnership Project 2” (3GPP2). NR is an emerging wireless communications technology under development.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a first user equipment (UE), comprising:
- one or more antennas; and
- a processing system that includes processor circuitry and memory circuitry that stores code for the processor circuitry, the processing system configured to cause the apparatus to:
  - receive, from a second UE, an indication via assistance information indicating the second UE to provide assistance relating to training or utilizing a model, wherein the indication is based at least in part on a condition at the second UE;
  - receive, from the second UE and based at least in part on the assistance information, information based at least in part on a measurement by the second UE;
  - train a model using the information based at least in part on the measurement; and
  - perform a communication based at least in part on the model.

2. The apparatus of claim 1, wherein the information based at least in part on the measurement includes an inference based at least in part on the measurement by the second UE, and wherein the processing system, to train the model, is configured to cause the apparatus to train the model using the information based at least in part on the measurement as a ground truth.

3. The apparatus of claim 1, wherein the first UE is associated with a reduced capability relative to the second UE.

4. The apparatus of claim 1, wherein receiving the assistance information is based at least in part on a configuration of the first UE being incompatible with the model.

5. The apparatus of claim 4, wherein the configuration of the first UE is incompatible with the model based at least in part on at least one of:
- a number of antennas of the first UE,
- a positioning capability of the first UE, or
- a coverage range of the first UE.

6. The apparatus of claim 1, wherein the assistance information is from a base station.

7. The apparatus of claim 1, wherein the processing system is configured to cause the apparatus to:
- transmit a request for the assistance relating to training or utilizing the model, wherein receiving the assistance information is based at least in part on the request.

8. The apparatus of claim 1, wherein receiving the assistance information is based at least in part on establishing a connection with the second UE.

9. The apparatus of claim 1, wherein the processing system is configured to cause the apparatus to:

receive, from a base station prior to training the model, information indicating the model.

10. The apparatus of claim 1, wherein the condition at the second UE is that a battery power of the second UE satisfies a threshold.

11. An apparatus for wireless communication at a first user equipment (UE), comprising:

one or more antennas; and a processing system that includes processor circuitry and memory circuitry that stores code for the processor circuitry, the processing system configured to cause the apparatus to:

transmit an indication via assistance information indicating that the first UE is configured to provide assistance relating to training or utilizing a model to a second UE, wherein the indication via the assistance information is based at least in part on a condition associated with the first UE;

receive information indicating the model;

receive information indicating a measurement value from the second UE;

train the model based at least in part on the measurement value; and provide one or more parameters of the model, or a result determined using the model, to the second UE.

12. The apparatus of claim 11, wherein the processing system is configured to cause the apparatus to:

receive, from the second UE, an indication to perform a measurement; and determine the measurement value based at least in part on the measurement.

13. The apparatus of claim 12, wherein the indication identifies at least one of:

a type of the measurement, a target for the measurement value, or a feature for which the measurement is to be performed.

14. The apparatus of claim 11, wherein the measurement value is an input to the model and the result is an output of the model that is based at least in part on the measurement value.

15. The apparatus of claim 11, wherein the assistance information is to a base station.

16. The apparatus of claim 15, wherein the assistance information is via UE capability signaling.

17. The apparatus of claim 11, wherein the condition is based at least in part on a battery power associated with the first UE.

18. The apparatus of claim 11, wherein transmitting the assistance information is based at least in part on a request, from the second UE, for the assistance relating to training or utilizing the model.

19. The apparatus of claim 11, wherein transmitting the assistance information is based at least in part on establishing a connection with the second UE.

20. The apparatus of claim 11, wherein transmitting the assistance information is based at least in part on the first UE and the second UE being located in an environment for a threshold length of time.

21. The apparatus of claim 11, wherein the second UE is associated with a reduced capability relative to the first UE.

22. The apparatus of claim 11, wherein the condition at the first UE is that a battery power of the first UE satisfies a threshold.

23. A method of wireless communication performed by a first user equipment (UE), comprising:

receiving, from a second UE, an indication via assistance information indicating the second UE to provide assistance relating to training or utilizing a model, wherein the indication via the assistance information is based at least in part on a condition associated with the first UE;

receiving, from the second UE and based at least in part on the assistance information, information based at least in part on a measurement by the second UE;

training a model using the information based at least in part on the measurement; and performing a communication based at least in part on the model.

24. A method of wireless communication performed by a first user equipment (UE), comprising:

transmitting an indication via assistance information indicating that the first UE is configured to provide assistance relating to training or utilizing a model to a second UE, wherein the indication via the assistance information is based at least in part on a condition associated with the first UE;

receiving information indicating the model;

receiving information indicating a measurement value from the second UE;

training the model based at least in part on the measurement value; and providing one or more parameters of the model, or a result determined using the model, to the second UE.

* * * * *